(12) United States Patent
Ranta-Aho et al.

(10) Patent No.: US 7,133,690 B2
(45) Date of Patent: Nov. 7, 2006

(54) METHOD AND APPARATUS FOR FAST DATA RATE RAMP UP IN NODE B SCHEDULING OF UE UPLINK

(75) Inventors: Karri Ranta-Aho, Espoo (FI); Tero Henttonen, Espoo (FI)

(73) Assignee: Nokia Corporation, Espoo (FI)

( * ) Notice: Subject to any disclaimer, the term of this patent is extended or adjusted under 35 U.S.C. 154(b) by 113 days.

(21) Appl. No.: 10/764,143

(22) Filed: Jan. 23, 2004

(65) Prior Publication Data

US 2005/0163056 A1 Jul. 28, 2005

(51) Int. Cl.
*H04Q 7/20* (2006.01)
(52) U.S. Cl. ............... 455/522; 455/67.11; 455/115.1; 455/318
(58) Field of Classification Search ........... 455/522, 455/67.11, 115.1, 318, 509, 510, 515; 370/438, 370/443, 444
See application file for complete search history.

(56) References Cited

U.S. PATENT DOCUMENTS

2005/0111397 A1* 5/2005 Attar et al. ............... 370/319
2005/0169301 A1* 8/2005 Jain et al. .................. 370/464

OTHER PUBLICATIONS

3GPP TR 25.896 V1.1.2 (Dec. 2003), Technical Report 3rd Generation Partnership Project; Technical Specification Group Radio Access Network; Feasibility Study for Enhanced Uplink for UTRA FDD; (Release 6), chapter 7.1 and 7.1.1, 2003, (as published on the Internet), no month listed.
3GPP TSG-RAN WG1 #35 Meeting, Lisbon, Portugal, Nov. 17-21, 2003, Tdoc R1-031351, Agenda item: 7.1, Samsung, Brief overview of Node B controlled rate scheduling with fast ramping: text proposal, (as published on the Internet).
3GPP TSG-RAN WG1 #35 Meeting, Lisbon, Portugal, Nov. 17-21, 2003, Tdoc R1-031350, Agenda item: 7.1, Nokio and Samsung, Detailed description of Node B controlled rate scheduling, (as published on the Internet).

* cited by examiner

*Primary Examiner*—Temica Beamer
(74) *Attorney, Agent, or Firm*—Ware, Fressola, Van Der Sluys & Adolphson LLP

(57) ABSTRACT

A method and corresponding equipment for communicating from a Node B (10) to a UE device (11) a data rate pointer (11*a*) value indicating a new maximum allowed data rate in case of a current low value for the data rate pointer (11*a*), based on predetermined rules governing signaling to change the data rate pointer and used by the Node B (10) in responding to a change request from the UE device (11), rules that differ for different current values of the data rate pointer (11*a*), and in particular rules that allow for a fast ramp up in case of a current value of zero or less than a threshold.

41 Claims, 2 Drawing Sheets

METHOD AND APPARATUS FOR FAST DATA RATE RAMP UP IN NODE B SCHEDULING OF UE UPLINK

TECHNICAL FIELD

The present invention pertains to the field of wireless communication, especially via telecommunication networks according to 3GPP specifications. More particularly, the present invention pertains to uplink performance in the UMTS radio access network, UTRAN, and even more particularly, the invention is related to Node B scheduling of UE uplink.

BACKGROUND

An UMTS (Universal Mobile Telecommunication System) network includes a core network of various elements and also a radio access network, called UTRAN (UMTS terrestrial radio access network). A UTRAN includes radio network controllers (RNCs) that control so-called Node Bs, that in turn wirelessly communicate with UE (user equipment) devices, i.e. e.g. mobile phones. UMTS networks are provided and operated as specified by 3GPP (Third Generation Partnership Program) specifications, which are evolving, and which are issued in successive releases.

In the most current evolution, which will issue as release 6, a proposal has been made for a fast Node B controlled scheduling mechanism requiring both the UE and the Node B to individually maintain a data rate pointer indicating the maximum uplink data rate allowed for use by the UE; the data rate actually used (any rate up to and including the rate pointed to by the data rate pointer in communicating with the Node B) is indicated in a transport format combination indicator (TFCI) data object sent by the UE to the Node B. The data rate pointer is updated according to the prior art using differential signalling (increase/decrease); a Node B command to change the current value of the data rate pointer is a command to increase or decrease the data rate pointer, i.e. to change by a step the data rate that is pointed to by the data rate pointer, so as to point to the next higher or lower allowed data rate in a set of data rates known as a TFCS (transport format combination set). (A UE can only request a change of the data rate pointer—using rate request signalling—and the Node B is in control; if it finds a rate request from a UE acceptable, it updates its own pointer entity and signals a rate grant to the UE. If the Node B determines that no change should be made to the data rate pointer, it can indicate so using discontinuous (DTX) signaling or by some other signalling.)

Now in a typical case, initially a UE device is not transmitting data to a Node B, but then data arrives from an application hosted by the UE device and is stored in a transmission buffer within the UE device. If the UE then has a lot of data to transmit and the network could allow it to transmit at a high target data rate but the data rate pointer is set at a low value (or zero), getting to the high target data rate takes several rate request/rate grant cycles, each incrementing the data rate pointer by one step. Such a ramping up can be a relatively slow process and could be seen as suboptimal usage of uplink resources, causing longer than necessary delays to the end users.

Thus, what is needed—at least in some situations—is a mechanism for changing a UE data rate pointer from a low value to a high value faster than can be done using repeated increments of a single step.

DISCLOSURE OF THE INVENTION

Accordingly, in a first aspect of the invention, a method is provided by which a UE device configured for wireless communication with a node of a wireless communication system is instructed to adjust the value of a data rate pointer maintained in the UE device, the data rate pointer indicating a maximum allowed data rate available to the UE for uplink transmission of data to the node, the method including: a step in which the node issues to the UE device a change command in response to a change request by the UE device, the node issuing the change command based on predetermined rules; and a step in which the UE device adjusts the data rate pointer according to the change command and based on predetermined rules for interpreting the change command; the method characterized in that the predetermined rules used by the node in responding to the change request differ depending on the current value of the data rate pointer.

In accord with the first aspect of the invention, the predetermined rules may differ depending on the current value of the data rate pointer compared to a threshold value for the data rate pointer. Further, if the current value is less than the threshold value, the change command signals a new value for the data rate pointer or signals a number of steps by which to increment the data rate pointer. Further still, the new value may be signaled using a shared downlink channel along with an indicator for identifying the UE device, or may be signaled using a downlink dedicated physical data channel, or else may be signaled using a downlink dedicated data channel or a downlink dedicated signaling channel.

Also in accord with the first aspect of the invention, in accord with the predetermined rules used by the node in responding to the change request, the UE device may interpret the change command differently for different values of the current value of the data rate pointer. Further, the predetermined rules may differ depending on the current value of the data rate pointer compared to a threshold value for the data rate pointer. Further still, the change command may be an increment pointer command, and the method may be further characterized in that if the current value is less than the threshold value, then the UE device interprets the increment pointer command as a command to change the data rate pointer to a predetermined fast ramp-up pointer value or to change the data rate pointer by a predetermined fast ramp-up number of steps. Also further still, the change command may be a decrement pointer command, and if the current value is zero, then the UE device may interpret the decrement pointer command as a command to change the data rate pointer to a predetermined fast ramp-up pointer value or to change the data rate pointer by a predetermined fast ramp-up number of steps. Still also further still, if the current value is less than the threshold value, then the node may issue a sequence of bits of a predetermined length as the pointer change command, and the UE device may interpret the sequence of bits as conveying a value to which to change the data rate pointer or as conveying a number of steps by which to change the data rate pointer. Further still, the first bit of the sequence of bits may be a pointer increment command, and upon receiving the first bit of the sequence the UE device may immediately increment the data rate pointer by one step, and upon receiving the other bits of the sequence the UE device may then change the data rate pointer according to the predetermined rules governing receiving the sequence of bits as the pointer change command. Also further still, if a first bit in a sequence of pointer change command bits is not a pointer increment command, the UE device may interpret the first bit and the subsequent bits as individual pointer change commands (as opposed to a set of bits in combination conveying a single pointer change command to a fast ramp up value or a fast ramp up number of increments).

In a second aspect of the invention, a computer program product is provided comprising: a computer readable storage structure embodying computer program code thereon for execution by a computer processor in a node of a wireless communication system, with said computer program code characterized in that it includes instructions for performing the steps of a method of according to the first aspect of the invention and indicated as being performed by the node.

In a third aspect of the invention, a computer program product is provided comprising: a computer readable storage structure embodying computer program code thereon for execution by a computer processor in a user equipment device adapted for communication via a wireless communication system, with said computer program code characterized in that it includes instructions for performing the steps of a method of according to the first aspect of the invention and indicated as being performed by the UE device.

In a fourth aspect of the invention, an apparatus is provided for use by a UE device configured for wireless communication with a node of a wireless communication system, the apparatus for use in adjusting the value of a data rate pointer maintained in the UE device, the data rate pointer indicating a maximum allowed data rate available to the UE for uplink transmission of data to the node, the apparatus including: means by which the UE device receives from the node a change command; and means by which the UE device adjusts the data rate pointer according to the change command; the apparatus characterized by interpreting the change command based on predetermined rules that differ depending on the current value of the data rate pointer.

In a fifth aspect of the invention, an apparatus is provided for use by a node of a wireless communication system configured for wireless communication with a UE device, the apparatus for use in adjusting the value of a data rate pointer maintained in the UE device, the data rate pointer indicating a maximum allowed data rate available to the UE for uplink transmission of data to the node, the apparatus including: means by which the node issues to the UE device a change command for changing the value of the data rate pointer in response to a change request from the UE device; and means by which the node tracks the value of the data rate pointer; the apparatus characterized by responding to the change request with a pointer change command based on predetermined rules that differ depending on the current value of the data rate pointer.

In a sixth aspect of the invention, a system is provided including components hosted by a node of a wireless communication system and also components hosted by a UE device configured for wireless communication with the node, the system for use in instructing the UE device to adjust the value of a data rate pointer maintained in the UE device, the data rate pointer indicating a maximum allowed data rate available to the UE for uplink transmission of data to the node, the system including: means by which the node issues to the UE device a change command in response to a change request by the UE device, the node issuing the change command based on predetermined rules for responding to the change request; and means by which the UE device adjusts the data rate pointer according to the change command and based on predetermined rules for interpreting the change command; the system characterized in that the predetermined rules used by the node in responding to the change request differ depending on the current value of the data rate pointer.

In accord with the sixth aspect of the invention, the system may also include a controller element of a core network of the wireless communication system, and may be further characterized in that the controller element communicates to the node and to the UE device via the node information sufficient to specify parameters of the predetermined rules. Further, the parameters may include the threshold or the information characterizing a threshold. Further still, the information characterizing a threshold may be one or more allowed data rates. Also further still, the parameters may include the predetermined fast ramp-up pointer value. Also further still, the parameters may include the predetermined fast ramp-up number of steps.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
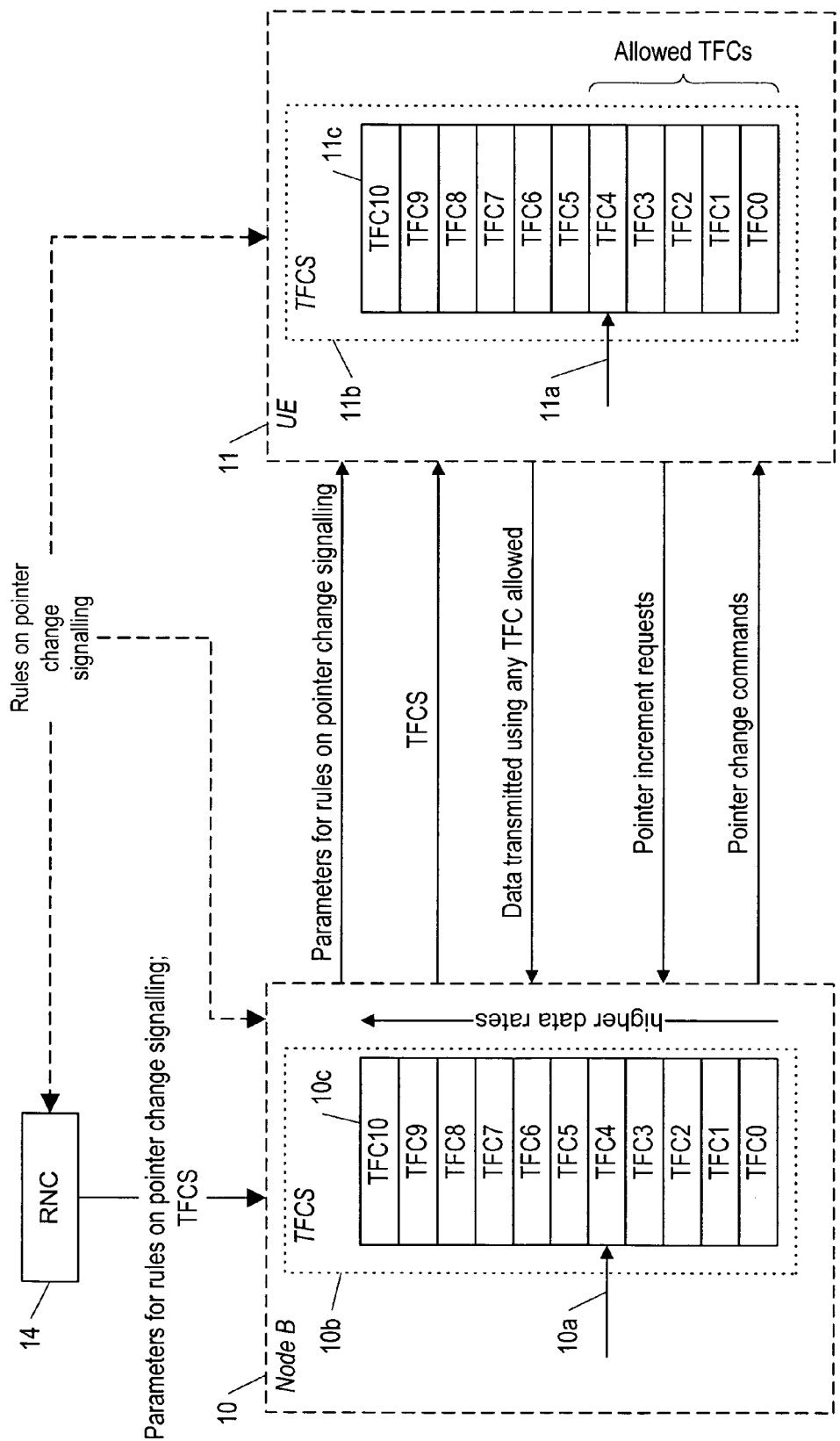
FIG. 1 is a block diagram/flow diagram of a UE device and a Node B communicating data and related signaling, some according to the prior art and some according to the invention.

Referring now to FIG. 1, both a Node B/base station—or more generally the access point of a radio access network of a wireless communication system—and a UE device communicatively coupled to the Node B maintain a respective TFCS (Transport Format Combination Set) 10b 11b. The TFCS is signaled to the Node B and to the UE (via the Node B) by a serving RNC (radio network controller) 14, or more generally an access point controller. Each TFCS 10b 11b includes the same set of TFCs (transport format combinations) 10c 11c; each TFC corresponds to a maximum allowed total data rate for uplink transmissions (from the UE to the Node B). The TFCs are assumed here to be arranged in order of increasing data rates, with a pointer 10a 11a indicating a particular one of the TFCs, and so indicating the corresponding data rate (which then in turn indicates a corresponding transmit power) as the maximum rate at which the UE device is allowed to communicate data to the Node B. A pointer, as the term is used here, is typically a data object used by executable code to point to a location in memory where a value of another data object is stored, in the case at hand, the other data object being a value for rate of uplink, as discussed below. (However, the term pointer should be understood here as meaning any indicator of a value of a data object corresponding to a rate of uplink. For example, the term pointer as used here can mean an integer value used to indicate a particular entry in a one-dimensional array of different possible uplink values.) The TFC pointed to by the data rate pointer 11a may be changed if the UE device requests and is granted a change via a change command issued by the Node B. (In addition, the Node B may issue an unsolicited change command, or the UE data rate 11a pointer may be changed without signalling, such as e.g. by a convention that both the Node B and the UE decrease their respective data rate pointers 10a 11a if the data rate used by the UE has been lower for some predetermined amount of time than the maximum indicated/allowed by the data rate pointer 11a.)

Now according to the invention, in order to provide for accelerated incrementing of the data rate pointer, the UE device 11 and the Node B 10 are operative in respect to changing the data rate pointer 11a (and so also the data rate pointer 10a of the Node B) according to predetermined rules built into (i.e. e.g. programmed into) the UE device and into the Node B that allow for accelerated ramp up in case of a suitably low current value of the data rate pointer (as opposed to the predetermined rules of a Node B according to the prior art governing how to respond to a pointer change request). The rules in effect provide for accelerated data rate pointer incrementing based on whether or not the current data rate pointer value is less than a threshold, or is zero. The threshold functions as a (dynamic/changeable) parameter of the predetermined rules, and is advantageously communicated to the Node B and the EU device by the RNC 14.

Figure 2:
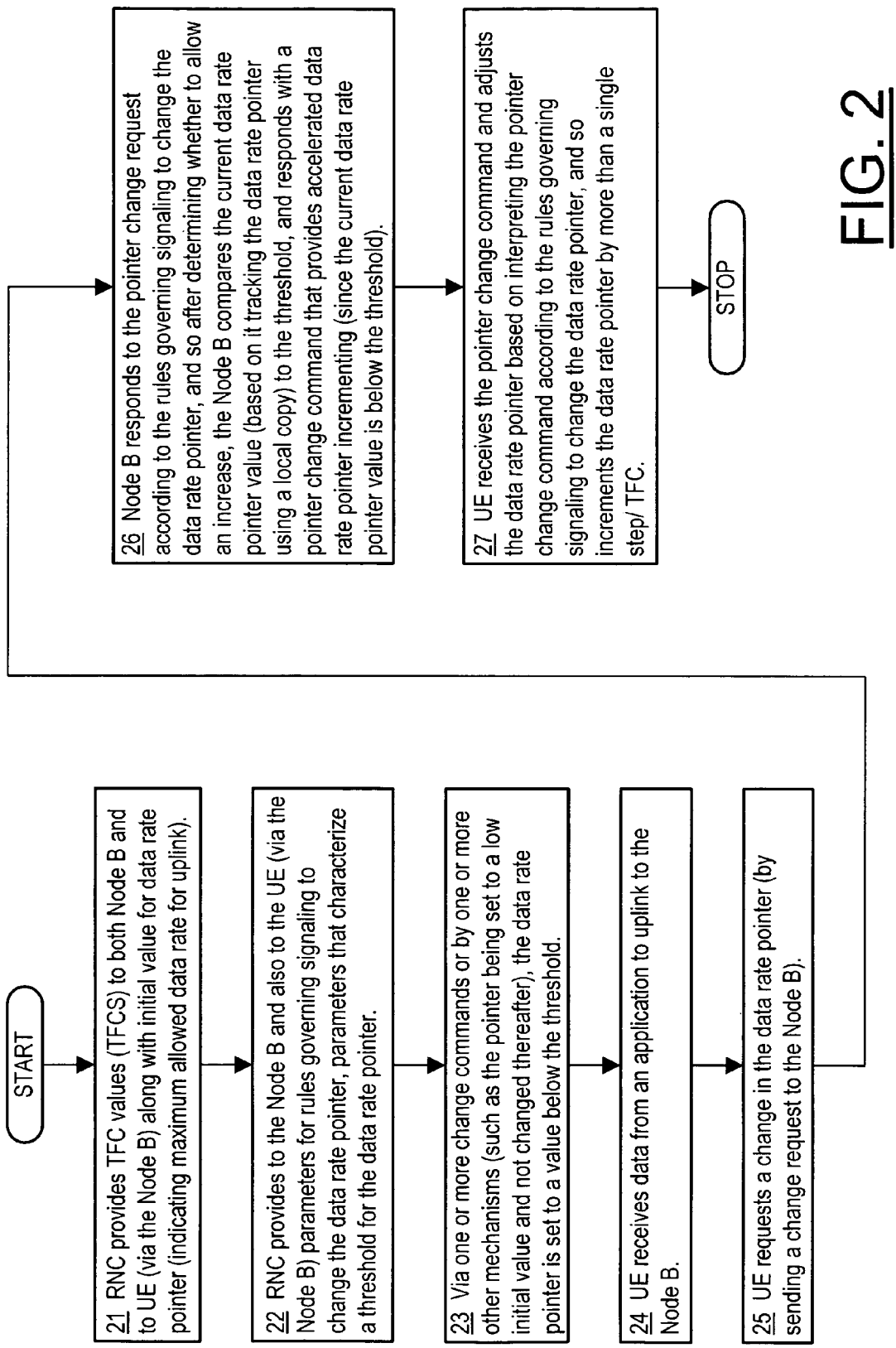
FIG. 2 is a flow chart of UE/Node B signalling to change the data rate pointer indicating the maximum data rate allowed for use by the UE device, according to the invention.

Thus, and now referring also to FIG. 2, in a method according to the invention there is a step 21 in which the RNC 14 provides TFC values to both the Node B 10 and to the UE device 11 (via the Node B) along with an initial value for the data rate pointer. In a next step 22, the RNC 14 provides to the Node B 10 and also to the UE device 11 parameters for the rules governing signaling to change the data rate pointer, parameters that specify or otherwise characterize a threshold for the data rate pointer. The parameters could for example simply indicate a value, or could indicate a particular TFC in the TFC set previously communicated by the RNC to the Node B and to the UE device. In a next step 23, assuming a scenario in which the data rate pointer is set to a value below the threshold, it is so set either as an initial value setting or via one or more change commands or implicitly according to predetermined rules for implicit pointer change (mentioned above, i.e. by convention regarding changing the data rate pointer without signalling e.g. in case of the data rate used having been less than the maximum allowed amount for a predetermined amount of time). In a next step 24, the UE device receives data from an application hosted by the UE device, data that the UE device must uplink to the Node B. In a next step 25, the UE device requests a change in the data rate pointer by sending a change request to the Node B. (Before requesting a higher data rate, the UE must first evaluate according to a currently unspecified criteria if it could use a higher data rate than currently allowed.) In a next step 26, assuming here that the Node B scheduler would agree to the UE increasing its (maximum allowable) data rate, the Node B responds to the pointer change request according to the rules governing signaling to change the data rate pointer. Thus, the Node B compares the current data rate pointer value to the threshold, and since in the scenario assumed here the current value of the data rate pointer is less than the threshold, the Node B responds to the pointer change request with a pointer change command (which may be a sequence of pointer change commands/bits) that provides accelerated data rate pointer incrementing, (assuming that more than one step of data rate increase was accepted by the Node B scheduler). In a next step 27, the UE device receives the pointer change command (which may include e.g. two pointer increment commands signalling a change by more than two steps, as described below) and adjusts the data rate pointer based on interpreting the pointer change command according to the rules governing signaling to change the data rate pointer. Since, according to the scenario assumed here, the current value of the data rate pointer is less than threshold, the UE device will interpret the pointer change command, which can be various different signals as described below, so as to increment the data rate pointer by more than a single step/TFC, i.e. so as to move the data rate pointer to a TFC that is more than one position from the current position. Thus, the Node B uses rules governing signaling to change the data rate pointer that differ depending on the current value of the data rate pointer. Further, the interpretation of a pointer change command made by the UE device is based on the rules governing the signaling to change the data rate pointer; thus the UE device takes into account the current value of the data rate pointer and so makes a possibly different interpretation of a pointer change command in the case of the current data rate pointer being less than the threshold.

It is important to understand that in some embodiments the predetermined rules (governing signaling to change the data rate pointer) can use an explicit numerical value for a threshold for triggering accelerated ramp up, and other embodiments can use as a threshold an indication of a particular TFC, or even the TFC in an indicated subset of the TFCS corresponding to the largest maximum allowed data rate of the TFCs in the subset. Thus, the term threshold as used here should be understood broadly as meaning an indication, either express or implied, of a data rate value used as a basis for triggering accelerated ramp up.

The invention also encompasses having different thresholds and corresponding different rules, i.e. ramp up at a first acceleration in case the current data rate pointer has a value less than or equal to a first threshold, and ramp up at a second (greater) acceleration in case the current data rate pointer has a value less than or equal to a second (greater) threshold, but greater than the first threshold, and so on.

To provide for accelerated ramp up, the pointer change command issued by the Node B can signal a new (explicit) value for the data rate pointer 11a, or can indicate a number of steps by which to increment the pointer (so that it points to a TFC more than one position higher than the TFC currently pointed to) or can even be implicit, so that the pointer is changed in an accelerated way according to predetermined rules similar in nature to the convention described above—where the Node B and UE device both decrement their respective data rate pointers without signalling if the data rate used has been less than the maximum allowed for some predetermined time—but of course here the convention would specify that the data rate pointer would be increased (without express pointer change command signalling).

Whatever is signaled by the pointer change command can be communicated from the Node B 10 to the UE device 11 in various ways, such as e.g. using a shared downlink channel along with an indicator for identifying the UE device 11 so that the UE device can determine that the pointer change command is intended for it. Alternatively, the pointer change command can be signaled using a downlink dedicated physical data channel (DPDCH), in which case some bits would be "stolen" and used for communicating the pointer change command, a mechanism that is feasible since the stealing of bits would occur only every once in a while, and even less often on account of the invention providing a single pointer change command to move the data rate pointer several steps (TFCs) at a time. Alternatively, and most advantageously in case of applications having a relatively frequent need for accelerated ramp up, a (new or existing) downlink dedicated channel can be used, such as a downlink dedicated signaling channel or even a downlink dedicated data channel. In 3GPP terminology, signaling between the Node B and the UE is carried over DPCCH (dedicated physical control channel), and the user data, network and application level signalling, and the signalling the RNC exchanges with the UE is carried over DPDCH (dedicated physical data channel). Thus, in 3GPP terminology, the invention encompasses embodiments in which signaling regarding the data rate pointer is carried on either a dedicated physical control channel (i.e. a signaling channel in more general terminology) or a dedicated physical data channel or both.

As explained, not only can the Node B 10 provide a different response to a pointer change (increment) request depending on the current value of the data rate pointer, but in addition, the UE device 11 can interpret a pointer change command differently for different current values of the data rate pointer 11a. Thus, e.g., even if the Node B issues the same actual response—a pointer increment command—to a pointer change (increment) request, a UE device according to the invention would, in some embodiments, understand the pointer change command as a command to either increment the pointer by some predetermined number of steps (greater than one)—i.e. a predetermined fast ramp-up number of steps—or to change the pointer so as to point to a predetermined rate/TFC—i.e. to change the pointer 11a to a predetermined fast ramp-up pointer value. And of course a Node B according to the invention would adjust its copy 10a of the data rate pointer 11a in the same way.

In some embodiments, in response to a pointer change request (to increment the data rate pointer 11a) the change command can even be a decrement pointer command, and if the current value is zero, then the UE device 11 interprets the decrement pointer command as a command to change the data rate pointer to a predetermined fast ramp-up pointer value or to change the data rate pointer by a predetermined fast ramp-up number of steps.

As another alternative to signalling so as to provide an accelerated ramp up if the current value is less than the threshold value, the Node B 10 issues a sequence of bits of a predetermined length conveying (as e.g. a N-bit number, with N predetermined) a TFC pointer target value (a fast ramp-up pointer value) or conveying a number of steps the TFC pointer is to be incremented (a fast ramp-up number of steps). The first bit in such a sequence should be a pointer increment command bit (and not either a pointer decrement command bit or, in one embodiment of three-stage signaling, a null pointer change command bit (no transmission, i.e. a null response) so as to distinguish the command from a pointer decrement command or (in case of three-stage signaling) a null response/null pointer change command. After receiving the first bit in the sequence (a pointer increment command), the UE could advantageously immediately start transmitting with a one step higher data rate, and upon reception of the subsequent bits in the sequence, determine the value indicated by the sequence and then move to the data rate indicated by the value.

As mentioned, the RNC 14 (i.e. a controller element of the core network of the wireless communication system) advantageously communicates to the Node B 10 and to the UE device 11 via the Node B information sufficient to specify parameters of the predetermined rules, the parameters including in some embodiments the threshold or information characterizing a threshold such as one or more allowed data rates/TFCs in the TFCS, and in some embodiments the predetermined fast ramp-up pointer value or the predetermined fast ramp-up number of steps.

The invention has been described in terms (primarily) of the steps of a method. The invention also comprehends equipment for performing the above described steps. Thus, for each step described above in connection with FIG. 2, there can be a corresponding module included in one or another of the devices shown in FIG. 1—i.e. the UE device 11, the Node B 10, and the RNC 14. It is also possible for the functionality for performing several of the above-described steps to be incorporated into a single module. The modules may be implemented as hardware, or may be implemented as software or firmware for execution by a processor or by processors in respective different pieces of equipment (the UE device, the Node B, and the RNC). In particular, in the case of firmware or software, the invention is provided as a computer program product including a computer readable storage structure embodying computer program code—i.e. the software or firmware—thereon for execution by a computer processor.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method by which a user equipment device configured for wireless communication with a node of a wireless communication system is instructed to adjust the value of a data rate pointer maintained in the user equipment device, the data rate pointer indicating a maximum allowed data rate available to the user equipment for uplink transmission of data to the node, the method comprising:

the issuing to the user equipment device a pointer change command in response to a change request by the user equipment device, the node issuing the change command based on predetermined rules; and the user equipment device adjusting the data rate pointer according to the change command and based on predetermined rules for interpreting the change command;

wherein the predetermined rules used by the node in responding to the change request differ depending on the current value of the data rate pointer.

2. The method of claim 1, further wherein the predetermined rules differ depending on the current value of the data rate pointer compared to a threshold value for the data rate pointer.

3. The method of claim 2, further wherein if the current value is less than the threshold value, the change command signals a new value for the data rate pointer or signals a number of steps by which to increment the data rate pointer.

4. The method of claim 3, further wherein the new value is signaled using a shared downlink channel along with an indicator for identifying the user equipment device.

5. The method of claim 3, further wherein the new value is signaled using a downlink dedicated physical data channel.

6. The method of claim 3, further wherein the new value is signaled using a downlink dedicated data channel or a downlink dedicated signaling channel.

7. The method of claim 1, further wherein in accord with the predetermined rules used by the node in responding to the change request, the user equipment device interprets the change command differently for different values of the current value of the data rate pointer.

8. The method of claim 7, further wherein the predetermined rules differ depending on the current value of the data rate pointer compared to a threshold value for the data rate pointer.

9. The method of claim 8, wherein the change command is an increment pointer command, and if the current value is less than the threshold value, then the user equipment device interprets the increment pointer command as a command to change the data rate pointer to a predetermined fast ramp-up pointer value or to change the data rate pointer by a predetermined fast ramp-up number of steps.

10. The method of claim 8, wherein the change command is a decrement pointer command, and if the current value is zero, then the user equipment device interprets the decrement pointer command as a command to change the data rate pointer to a predetermined fast ramp-up pointer value or to change the data rate pointer by a predetermined fast ramp-up number of steps.

11. The method of claim 8, wherein if the current value is less than the threshold value, then the node issues a sequence of bits of a predetermined length as the pointer change command, and the user equipment device interprets the sequence of bits as conveying a value to which to change the data rate pointer or as conveying a number of steps by which to change the data rate pointer.

12. The method of claim 11, wherein the first bit of the sequence of bits is a pointer increment command, and upon receiving the first bit of the sequence the user equipment device immediately increments the data rate pointer by one step, and upon receiving the other bits of the sequence the user equipment device changes the data rate pointer according to the predetermined rules governing receiving the sequence of bits as the pointer change command.

13. The method of claim 12, wherein if a first bit in a sequence of pointer change command bits is not a pointer increment command, the user equipment device interprets the first bit and the subsequent bits as individual pointer change commands.

14. A computer program product comprising: a computer readable storage structure embodying computer program code thereon for execution by a computer processor in a node of a wireless communication system, with said computer program code comprising instructions for a method to be performed by the node, including:
  issuing to a user equipment device a pointer change command to change a pointer indicating a maximum allowed data rate, in response to a change request by the user equipment device, the node issuing the change command based on predetermined rules,
  wherein the predetermined rules used by the node in responding to the change request differ depending on the current value of the data rate pointer.

15. A computer program product comprising: a computer readable storage structure embodying computer program code thereon for execution by a computer processor in a user equipment device adapted for communication via a wireless communication system, with said computer program code comprising instructions for a method to be performed by the user equipment device, including:
  adjusting a data rate pointer according to a pointer change command to change a pointer indicating a maximum allowed data rate, with the adjusting performed based on predetermined rules for interpreting the change command;
  wherein the change command is received from a node in response to a change request provided to the node by the user equipment device, and the predetermined rules used by the node in responding to the change request differ depending on the current value of the data rate pointer.

16. An apparatus for use by a user equipment device configured for wireless communication with a node of a wireless communication system, the apparatus for use in adjusting the value of a data rate pointer maintained in the user equipment device, the data rate pointer indicating a maximum allowed data rate available to the user equipment for uplink transmission of data to the node, the apparatus comprising:
  means by which the user equipment device receives from the node a change command; and
  means by which the user equipment device adjusts the data rate pointer according to the change command by interpreting the change command based on predetermined rules that differ depending on the current value of the data rate pointer.

17. An apparatus for use by a node of a wireless communication system configured for wireless communication with a user equipment device, the apparatus for use in adjusting the value of a data rate pointer maintained in the user equipment device, the data rate pointer indicating a maximum allowed data rate available to the user equipment for uplink transmission of data to the node, the apparatus comprising:
  means by which the node issues to the user equipment device a pointer change command for changing the value of the data rate pointer in response to a change request from the user equipment device, with the change command based on predetermined rules that differ depending on the current value of the data rate pointer; and
  means by which the node tracks the value of the data rate pointer.

18. A system including components hosted by a node of a wireless communication system and also components hosted by a user equipment device configured for wireless communication with the node, the system for use in instructing the user equipment device to adjust the value of a data rate pointer maintained in the user equipment device, the data rate pointer indicating a maximum allowed data rate available to the user equipment for uplink transmission of data to the node, the system comprising:
  means by which the node issues to the user equipment device a pointer change command in response to a change request by the user equipment device, the node issuing the change command based on predetermined rules for responding to the change request; and
  means by which the user equipment device adjusts the data rate pointer according to the change command and based on predetermined rules for interpreting the change command;
  wherein the predetermined rules used by the node in responding to the change request differ depending on the current value of the data rate pointer.

19. The system of claim 18, further comprising a controller element (14) of a core network of the wireless communication system, and further wherein the controller element (14) is configured to communicate to the node and to the user equipment device via the node information sufficient to specify parameters of the predetermined rules.

20. The system of claim 19, wherein the parameters include the threshold or the information characterizing a threshold.

21. The system of claim 20, wherein the information characterizing a threshold is one or more allowed data rates.

22. The system of claim 20, wherein the parameters include the predetermined fast ramp-up pointer value.

23. The system of claim 20, wherein the parameters include the predetermined fast ramp-up number of steps.

24. An apparatus for use by a user equipment device configured for wireless communication with a node of a wireless communication system, the apparatus for use in adjusting the value of a data rate pointer maintained in the user equipment device, the data rate pointer indicating a maximum allowed data rate available to the user equipment for uplink transmission of data to the node, the apparatus comprising a computer processor configured to:
receive from the node a pointer change command; and
adjust the data rate pointer according to the change command by interpreting the change command based on predetermined rules that differ depending on the current value of the data rate pointer.

25. The apparatus of claim 24, wherein in accord with the predetermined rules, the processor is configured to interpret the change command differently for different values of the current value of the data rate pointer.

26. The apparatus of claim 24, wherein the predetermined rules differ depending on the current value of the data rate pointer compared to a threshold value for the data rate pointer.

27. The apparatus of claim 26, further wherein if the current value is less than the threshold value, the change command according to the predetermined rules signals a new value for the data rate pointer or signals a number of increments by which to increment the data rate pointer.

28. The apparatus of claim 26, wherein the change command is an increment pointer command, and the processor is configured so that if the current value is less than the threshold value, then the processor interprets the increment pointer command as a command to change the data rate pointer to a predetermined fast ramp-up pointer value or to change the data rate pointer by a predetermined fast ramp-up number of steps.

29. The apparatus of claim 26, wherein the change command is a decrement pointer command, and the processor is configured so that if the current value is zero, then the processor interprets the decrement pointer command as a command to change the data rate pointer to a predetermined fast ramp-up pointer value or to change the data rate pointer by a predetermined fast ramp-up number of steps.

30. The apparatus of claim 26, wherein if the current value is less than the threshold value, then the pointer change command is a sequence of bits of a predetermined length, and the processor is configured so as to interpret the sequence of bits as conveying a value to which to change the data rate pointer or as conveying a number of steps by which to change the data rate pointer.

31. The apparatus of claim 30, wherein the first bit of the sequence of bits is a pointer increment command, and the processor is configured so that upon receiving the first bit of the sequence the user equipment device immediately increments the data rate pointer by one step, and upon receiving the other bits of the sequence the user equipment device changes the data rate pointer according to the predetermined rules governing receiving the sequence of bits as the pointer change command.

32. The apparatus of claim 24, wherein the processor is configured so that if a first bit in a sequence of pointer change command bits is not a pointer increment command, the processor interprets the first bit and the subsequent bits as individual pointer change commands.

33. An apparatus for use by a node of a wireless communication system configured for wireless communication with a user equipment device, the apparatus for use in adjusting the value of a data rate pointer maintained in the user equipment device, the data rate pointer indicating a maximum allowed data rate available to the user equipment for uplink transmission of data to the node, the apparatus comprising a computer processor configured to:
issue to the user equipment device a pointer change command for changing the value of the data rate pointer in response to a change request from the user equipment device, with the change command based on predetermined rules that differ depending on the current value of the data rate pointer; and
track the value of the data rate pointer.

34. The apparatus of claim 33, wherein the processor is configured to issue the pointer change command so as to be signaled using a shared downlink channel along with an indicator for identifying the user equipment device.

35. The apparatus of claim 33, wherein the processor is configured to issue the pointer change command so as to be signaled using a downlink dedicated physical data channel.

36. The apparatus of claim 33, wherein the processor is configured to issue the pointer change command so as to be signaled using a downlink dedicated data channel or a downlink dedicated signaling channel.

37. The apparatus of claim 33, wherein the predetermined rules differ depending on the current value of the data rate pointer compared to a threshold value for the data rate pointer.

38. The apparatus of claim 37, further wherein if the current value is less than the threshold value, the change command is predetermined to signal a new value for the data rate pointer or signals a number of increments by which to increment the data rate pointer.

39. The apparatus of claim 37, wherein if the current value is less than the threshold value, then the processor is configured to issue a sequence of bits of a predetermined length as the pointer change command according to a predetermined rule by which the user equipment device is to interpret the sequence of bits as conveying a value to which to change the data rate pointer or as conveying a number of steps by which to change the data rate pointer.

40. The apparatus of claim 39, wherein the first bit of the sequence of bits is a pointer increment command, and according to the predetermined rules signals to the user equipment that upon receiving the first bit of the sequence the user equipment device is to increment the data rate pointer by one step, and upon receiving the other bits of the sequence the user equipment device is to change the data rate pointer according to the predetermined rules governing receiving the sequence of bits as the pointer change command.

41. The apparatus of claim 33, wherein if a first bit in a sequence of pointer change command bits is not a pointer increment command, the first bit and the subsequent bits are to be interpreted by the user equipment device as individual pointer change commands.

* * * * *

UNITED STATES PATENT AND TRADEMARK OFFICE
CERTIFICATE OF CORRECTION

PATENT NO.       : 7,133,690 B2
APPLICATION NO. : 10/764143
DATED            : November 7, 2006
INVENTOR(S)      : Karri Ranta-aho et al.

It is certified that error appears in the above-identified patent and that said Letters Patent is hereby corrected as shown below:

Title Page, item [75], under Inventors, delete "Karri-Ranta-Aho" and substitute --Karri Ranta-aho--.

Signed and Sealed this

Twenty-fourth Day of July, 2007

JON W. DUDAS
*Director of the United States Patent and Trademark Office*